(12) United States Patent
Nainar et al.

(10) Patent No.: US 10,805,215 B2
(45) Date of Patent: Oct. 13, 2020

(54) INTRA-HOST AND END-TO-END PACKET PATH AND TREATMENT TRACING USING IN-SITU OAM IN CONTAINER NETWORKING ARCHITECTURE

(71) Applicant: Cisco Technology, Inc., San Jose, CA (US)

(72) Inventors: Nagendra Kumar Nainar, Morrisville, NC (US); Carlos M. Pignataro, Cary, NC (US); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 15/926,292

(22) Filed: Mar. 20, 2018

(65) Prior Publication Data
US 2019/0297011 A1 Sep. 26, 2019

(51) Int. Cl.
*H04L 12/741* (2013.01)
*H04L 12/721* (2013.01)
*H04L 12/803* (2013.01)
*H04L 12/26* (2006.01)

(52) U.S. Cl.
CPC .............. *H04L 45/74* (2013.01); *H04L 43/10* (2013.01); *H04L 45/70* (2013.01); *H04L 47/125* (2013.01)

(58) Field of Classification Search
CPC ....... H04L 45/74; H04L 45/70; H04L 47/125; H04L 43/10
See application file for complete search history.

(56) References Cited

U.S. PATENT DOCUMENTS

| | | | |
|---|---|---|---|
| 2015/0244617 A1* | 8/2015 | Nakil .................. | G06F 9/45558 709/224 |
| 2018/0331933 A1* | 11/2018 | Song ..................... | H04L 43/028 |
| 2019/0014036 A1* | 1/2019 | Anand ............... | H04Q 11/0067 |

(Continued)

OTHER PUBLICATIONS

Brockners et al.,Data Fields for In-situ OAM, IETF/IPPM, draft-brockners-inband-oam-data-04, Sep. 10, 2017 (Year: 2017).*

(Continued)

*Primary Examiner* — Shailendra Kumar
(74) *Attorney, Agent, or Firm* — Edell, Shapiro & Finnan, LLC (57) ABSTRACT

Presented herein are techniques for monitoring packets in a container networking environment. A method includes receiving a packet at a network node, the packet having been routed to the network node in accordance with instructions from a container orchestration system, inserting an additional field in the packet that is configured to record a path of the packet within a first POD of the host device that includes at least one container, forwarding the packet to the first POD of the host device in accordance with the instructions from the container orchestration system, updating the additional field with container networking path information as the packet transits the first POD and the at least one container therein, storing the container path information in an analytics node of the network node, removing the additional field from the packet, and transmitting the packet from the network node to the network.

20 Claims, 9 Drawing Sheets

(56) References Cited

U.S. PATENT DOCUMENTS

2019/0042320 A1\* 2/2019 Prince ...................... G06F 8/71

OTHER PUBLICATIONS

Kablan, et al., "Stateless Network Functions," HotMiddlebox'15, Aug. 2015, 6 pages.
Brockners, et al., "Data Fields for In-situ OAM," draft-brockners-inband-oam-data-04, IETF, ippm, Internet Draft, Experimental, Mar. 29, 2017, 25 pages.

\* cited by examiner

INTRA-HOST AND END-TO-END PACKET PATH AND TREATMENT TRACING USING IN-SITU OAM IN CONTAINER NETWORKING ARCHITECTURE

TECHNICAL FIELD

The present disclosure relates to computer networks, and more specifically to tracing a path and/or transformation of a packet transiting a container networking architecture.

BACKGROUND

One way to deploy applications is to install the applications on a host using an operating system (OS) manager, e.g., a hypervisor This has a disadvantage, however, of entangling, e.g., the applications' executables, configuration, libraries, and lifecycles with each other and with the host OS.

Another way to deploy applications is to use "containers" based on operating-system-level virtualization rather than hardware virtualization. Such containers are isolated from each other and from the host. They may have their own filesystems, they may not see each other's processes, and their computational resource usage can be bounded. They may be easier to build than virtual machines (VMs), and because they are decoupled from the underlying infrastructure and from the host filesystem, they are portable across clouds and OS distributions. In order to manage multiple containers, which may be deployed across multiple hosts, a container orchestration system is often employed. One popular such container orchestration system is "Kubernetes," which is an open-source platform designed to automate deploying, scaling, and operating application containers, and provides a "master" central controller for the container orchestration system that may be configured to orchestrate packet movement to different containers hosted on one or more physical hosts.

DESCRIPTION OF EXAMPLE EMBODIMENTS

Overview

Presented herein are techniques for monitoring packets in a container networking environment. A method includes receiving a packet at a network node (e.g., a server) that is in communication with a network, the packet having been routed to the network node in accordance with instructions from a container orchestration system, inserting an additional field in the packet that is configured to record a path of the packet within the network node that includes at least one POD (e.g., a set of one or more containers which share the same network namespace), forwarding the packet to a first POD of the network node in accordance with the instructions from the container orchestration system, updating the additional field with container path information as the packet transits the first POD and at least one container therein, storing the container path information in an analytics node, removing the additional field from the packet, and transmitting the packet from the network node to the network. The foregoing may be considered an "intra-host" packet monitoring solution in a container networking environment.

Also presented herein is a device that includes an interface unit configured to enable network communications, memory, and one or more processors coupled to the interface unit and the memory, and configured to: receive a packet from a network, the packet having been routed to the device in accordance with instructions from a container orchestration system, insert an additional field in the packet that is configured to record the path of the packet within a first POD of the device that includes at least one container, forward the packet to the first POD of the device in accordance with the instructions from the container orchestration system, update the additional field with container path information as the packet transits the first POD and the at least one container therein, store the container path information in an analytics node, remove the additional field from the packet, and transmit the packet from the device to the network. Such a device enables the "intra-host" packet monitoring solution in a container networking environment.

Still also presented herein are techniques for monitoring packets in a container networking environment. A method includes receiving a packet at a network node that is in in communication with a network, the packet having been routed to the network node in accordance with instructions from a container orchestration system, forwarding the packet to a first POD of the network node in accordance with the instructions from the container orchestration system, updating an additional field of the packet with container path information as the packet transits the first POD and at least one container therein, and transmitting the packet from the network node to the network. The foregoing may be considered an "end-to-end" packet monitoring solution in a container networking environment.

Example Embodiments

As mentioned above, containers offer certain advantages, and have thus seen increased usage. Containers can be isolated from each other and from their host(s). They may have their own filesystems, they may not see each other's processes, and their computational resource usage can be bounded. They may be easier to build than virtual machines (VMs), and because they are decoupled from the underlying infrastructure and from the host filesystem, they are portable across clouds and OS distributions, provided OS distributions use the same underlying kernel.

A given container may be configured to run a predetermined application, such as an end user application, e.g., a word processing application, or a network-related application such as network address translation (NAT) or a component thereof. Because a given packet might need to traverse a plurality of containers to achieve a certain or predetermined function, and those containers may be deployed on different hosts, different nodes within a given host, or different PODs within a given node, a container orchestration system is often employed to cause individual packets and flows to transit the appropriate containers in the desired order, regardless of where the containers may be deployed.

One popular container orchestration system is "Kubernetes," which is an open-source platform designed to automate deploying, scaling, and operating application containers, and provides a "master" central controller for the container orchestration system that may be configured to orchestrate packet movement to different containers hosted on one or more physical hosts. One issue with Kubernetes is that a network administrator, i.e., an entity managing one or more physical hosts or nodes, may have little to no visibility of a given packet's path among the containers, and, likewise, may have very little visibility into how a given packet is transformed as it transits respective containers.

In-situ Operations, Administration, and Maintenance (IOAM) is a network management solution that is arranged to record operational and telemetry information for a packet while the packet traverses a path between two points in a network. The term "in-situ" refers to the fact that IOAM data is added to a given data packet (in its own dedicated added field) rather than being sent within packets specifically dedicated to IOAM information. As such, IOAM can provide real-time data to track the path of packets and understand how given traffic is performing. In one implementation, IOAM adds a tag or header field to each packet, and every node through which the packet passes can write metadata to the header, such as the node's identity, the interface and egress ports, and other details.

Embodiments described herein apply IOAM to a container networking environment conducted by a container orchestration system like Kubernetes. By applying IOAM in this fashion, a network administrator may obtain insight into the path a packet takes in a container environment, and can further glean additional details about how the packet or data carried thereby may have been transformed. For example, obtained IOAM data may reveal transformations such as network address translation and tunneling, among other activities. Further, those skilled in the art will appreciate that Kubernetes may be implemented and controlled by a network plugin. Thus, functionality described herein may also be performed by one or more appropriate network plugins.

Figure 1:
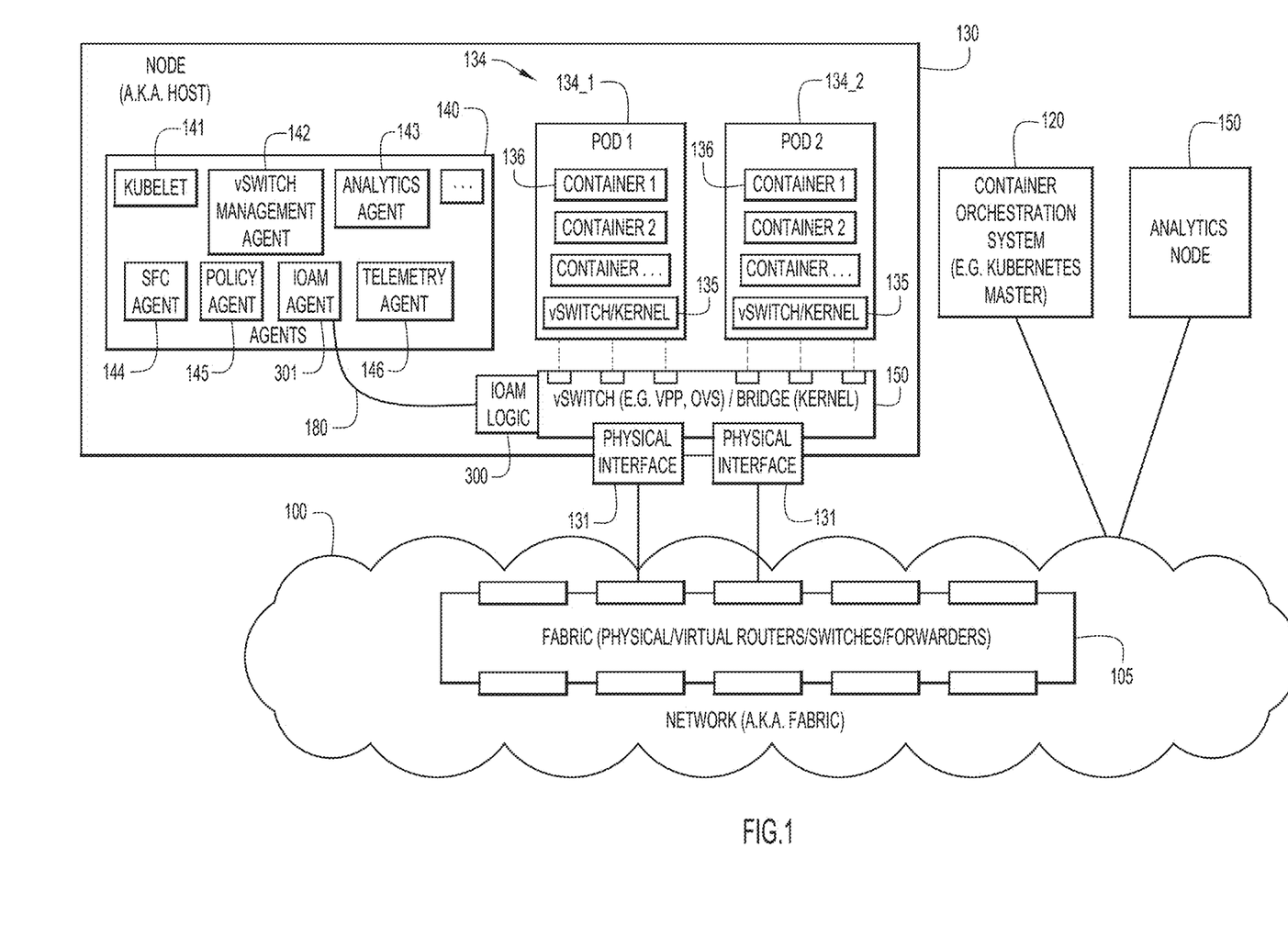
FIG. 1 depicts a network topology including a host or node hosts an In-Situ Operations, Administration and Maintenance (IOAM) agent and associated IOAM logic to obtain intra-host IOAM data for packets transiting a container network environment in accordance with an example embodiment.

FIG. 1 depicts a network topology including a host or node that hosts an In-Situ Operations, Administration and Maintenance (IOAM) agent and associated IOAM logic to obtain intra-host IOAM data for packets transiting a container network environment in accordance with an example embodiment. Specifically, FIG. 1 shows a network or fabric 100, e.g., the Internet or private network, which enables communication between a container orchestration system 120 such as a Kubernetes Master, and one or more nodes 130. Network 100 includes any number of physical or virtual routers or switches or forwarders 105 that enable packets to move from one network element to another. A network node, or simply "node," 130 may be a physical device, such as a computer server like that illustrated in connection with FIG. 8 described later herein.

Deployed on node 130 are several components including a virtual switch 160 that may comprise a vector packet processor (VPP) or Open vSwitch (OVS) or bridge (kernel) that is in communication with network 100 via one or more physical interfaces 131, plurality of service agents 140, a plurality of PODs 134, including 134_1, 134_2, and a plurality of containers 136 distributed in the PODs 134. An analytics node 150 is also depicted as being in communication with network 100.

Service agents 140 may include a Kubernetes Kubelet agent 141, a vSwitch management agent 142, an analytics agent 143, a Service Function Chaining (SFC) agent 144, a policy agent 145 for, e.g., node-specific policies, a telemetry agent 146 an IOAM agent 301, which operates in conjunction with IOAM logic 300, which are both described more fully herein.

In one embodiment, an administrator of a given node 130 may want to learn more about how container orchestration system 120 is routing packets on its hardware. Presently, a container orchestration system like Kubernetes does not provide visibility into packet paths or packet transformations that occur on a given node 130. To enable monitoring of such packets, embodiments described herein enable IOAM to be implemented for packets that are conducted by a container orchestration system. In an embodiment, IOAM data collection may be triggered by IOAM agent 301 sending IOAM instructions 180 to vSwitch 160. Instructions 180 may be configured, in conjunction with IOAM logic 300, to cause an IOAM header to be added to a selected packet received at vSwitch 160. Such a header may be used to record or collect path and/or packet transformation information (telemetry) as the selected packet transits different components deployed on node 130. The recorded IOAM data may then be extracted and provided to analytics node 150 for analysis. An administrator (not shown) may program IOAM agent 301 to send the IOAM instructions 180.

In one implementation, vSwitch 160 may be configured to apply various network policies, including load-balancing and network address translation (NAT). Also, and notably, IOAM logic 300 may also be deployed on any one or more of PODs 134, containers 136, or even within fabric 105 such that IOAM data can be inserted or removed at any of these locations during the transit of packet through the infrastructure.

Figure 2:
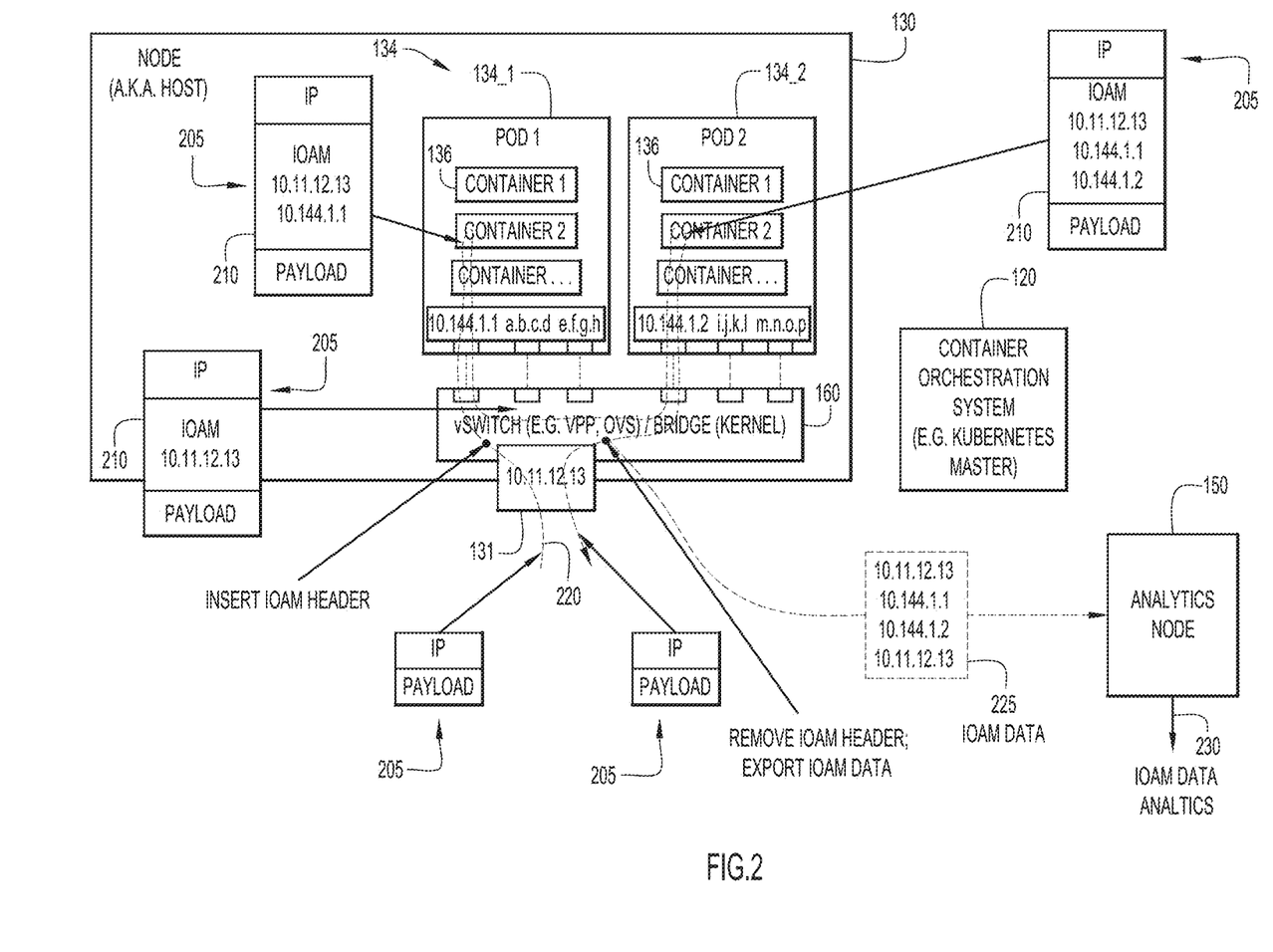
FIG. 2 depicts the path of a packet, which is configured to record IOAM data as the packet transits containers and other elements on a node in accordance with an example embodiment.

FIG. 2 depicts a path 220 of a packet 205 that is configured to record IOAM data as the packet transits containers and other elements on the node 130 in accordance with an example embodiment. Node 130 depicted in FIG. 2 is similar to node 130 depicted in FIG. 1 but, for clarity, illustrates fewer elements. As shown, packet 205 arrives at node 130 as a result of, e.g., routing instructions from container orchestration system 120. In this case, it is assumed that IOAM agent 301 has instructed vSwitch 160 to trigger IOAM data collection. As a result, packet 205 which arrives with, among possible other fields, an Internet Protocol (IP) addressing and a payload, is augmented with an IOAM header 210. Packet 205 then transits node 130, including, e.g., vSwitch 160, POD 1 134_1 including containers 136 therein, POD 2 134_2 and containers 136 therein, and returns, ultimately to vSwitch 160 where the IOAM data is extracted and the IOAM header 210 is removed before the packet is transmitted outside of node 130. In a simplified example, and as shown in FIG. 2, packet 205 enters node 130 via address 10.11.12.13, which is recorded in IOAM header 210. Then, after packet 205 transits POD 1 134_1 and POD2 134_2, IOAM header 210 is further updated with telemetry indicating that the packet 205 has transited PODs POD1 and POD2 via 10.144.1.1 and 10.144.1.2. When the packet 205 arrives back at vSwitch 160, the IOAM data is extracted and sent, at 225, to analytics node 150. Analytics node 150 may then process the data and output IOAM data analytics 230 (e.g., packet path metrics, throughput, latency, etc.).

As is seen in FIG. 2, node and POD path information is provided in the IOAM data or telemetry. Such path information may be considered "summary" IOAM data in connection with the embodiments described herein. Summary IOAM data is distinguished from "verbose" IOAM data which might include not only the summary (packet path, i.e., network addresses) IOAM data, but also data indicating what specific actions or transformations may have occurred to a given packet during its transit through the node 130. Example verbose IOAM data is discussed more fully in connection with FIGS. 5 and 6A and 6B.

Figure 3:
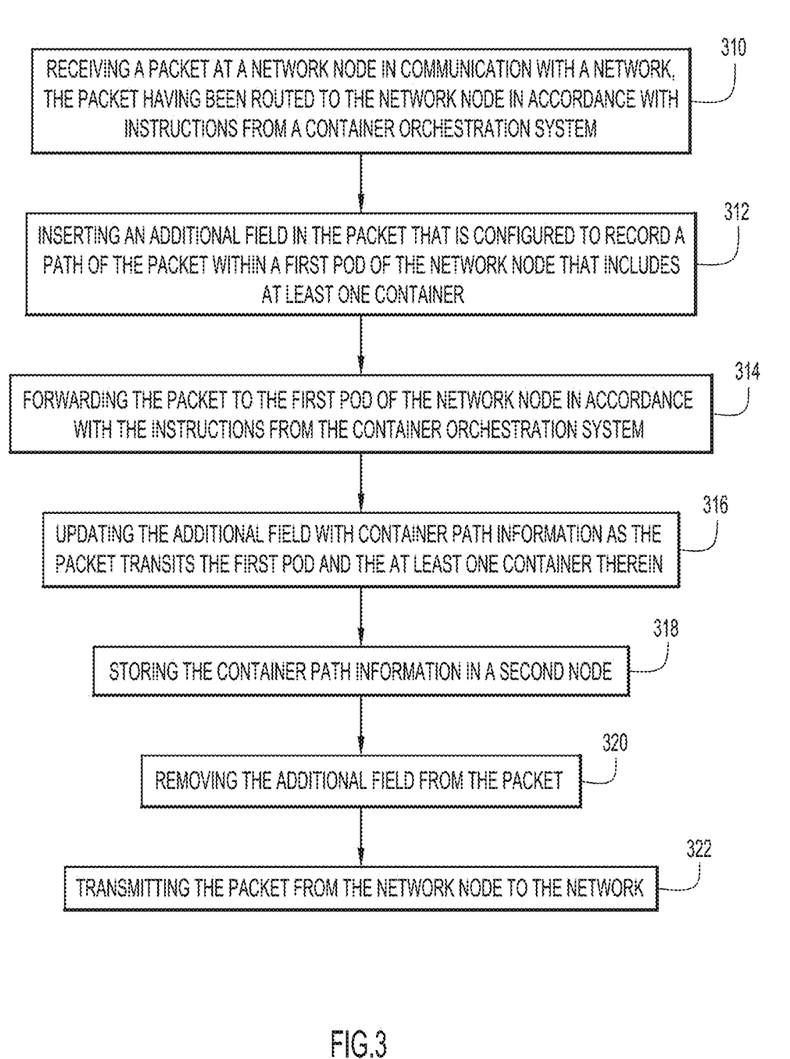
FIG. 3 is a flow chart depicting a series of operations that may be performed in connection with intra-host IOAM data collection in accordance with an example embodiment.

FIG. 3 is a flow chart depicting a series of operations that may be performed (by, e.g., IOAM logic 300 and IOAM agent 301) in connection with intra-host IOAM data collection in accordance with an example embodiment. Reference may also be made to FIG. 2. At 310, a packet is received at a node in communication with a network, the packet having been routed to the node in accordance with instructions from a container orchestration system. At 312, an additional (header) field is inserted in the packet that is configured to record a path of the packet within a first POD of the node that includes at least one container. At 314, the packet is forwarded to the first POD of the network device in accordance with the instructions from the container orchestration system. At 316, the additional (header) field is updated with container path information as the packet transits the first POD and the at least one container therein. At 318, the container networking path information is stored in a second node (e.g., analytics node 150). At 320, the additional (header) field is removed from the packet, and, at 322, the packet is transmitted from the host device to the network.

Thus, the methodology described with respect to FIG. 3 enables an administrator to closely monitor the path of a packet within a container network environment controlled by a container orchestration system like Kubernetes by instantiating IOAM data collection within a given host.

Figure 4:
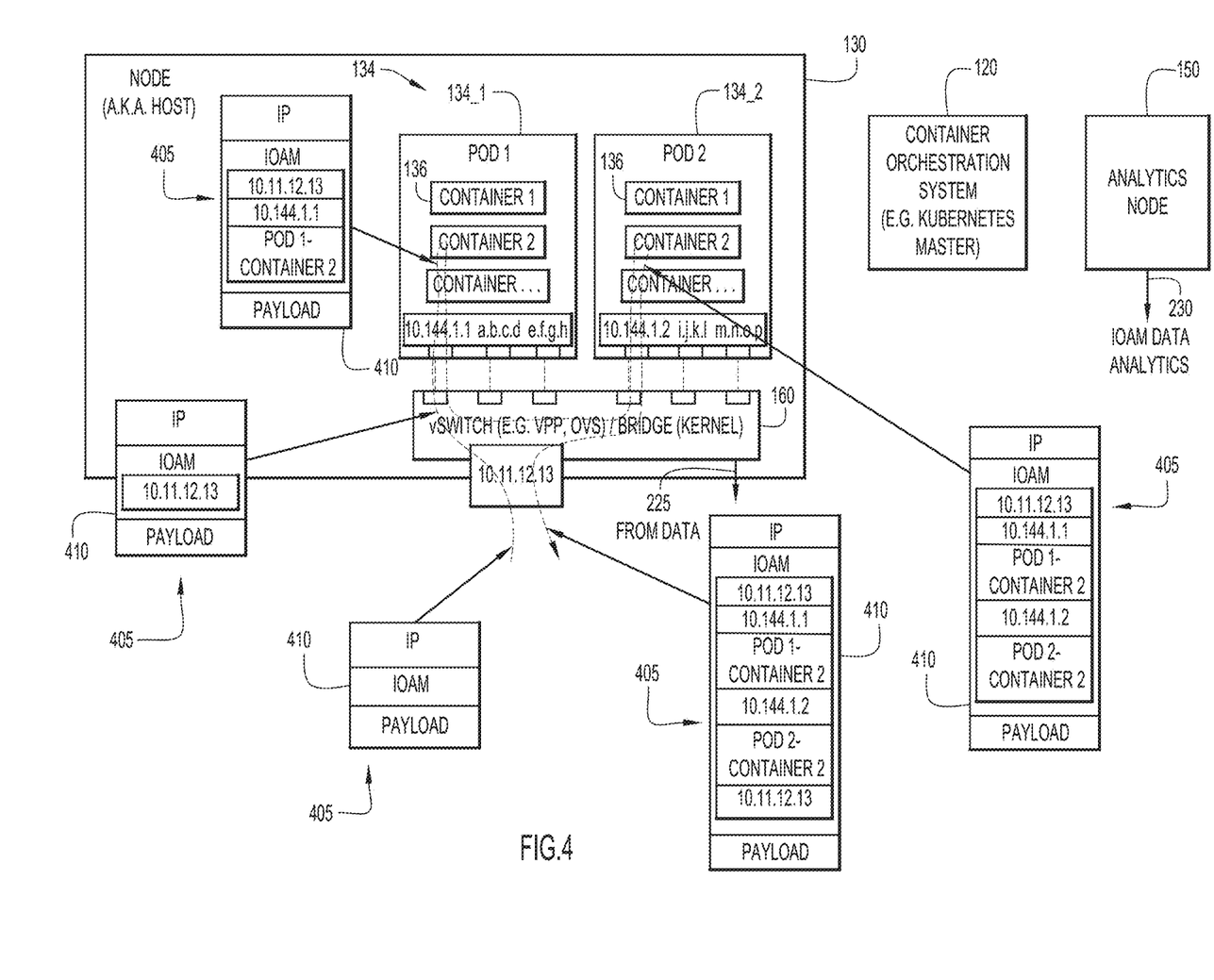
FIG. 4 depicts the path of an IOAM header-augmented packet, which is configured to record IOAM data as the packet transits containers and other elements on the node in an end-to-end IOAM data collection deployment in accordance with an example embodiment.

FIG. 4 depicts the path of an IOAM header-augmented packet that is configured to record IOAM data as a packet 405 transits containers and other elements on the node 130 in an end-to-end IOAM data collection deployment in accordance with an example embodiment. Node 130 depicted in FIG. 4 is similar to node 130 depicted in FIG. 1 but, for clarity, illustrates fewer elements. As shown, packet 405 arrives at node 130 as a result of, e.g., container orchestration system routing instructions. As can be seen in FIG. 4, packet 405, upon arrival at node 130, is already configured with an IOAM header 410. That is, the IOAM data being collected or recorded by IOAM header 405 in the embodiment of FIG. 4 is not necessarily restricted to a given node 130 (i.e., intra-host collection), but rather may be collected as packet 405 transits multiple nodes or hosts. Stated alternatively, another node may have already inserted the IOAM header 410, and upon exiting, e.g., its vSwitch toward network 100, the IOAM header was not removed, as would be case in the intra-host IOAM data collection embodiment depicted in FIG. 2.

Thus, as shown in FIG. 4, packet 405 transits node 130, including, e.g., vSwitch 160, POD 1 134_1 and POD 2 134_2 (and containers therein) and returns, ultimately to vSwitch 160. Optionally, the IOAM data may be extracted at 225, but the IOAM header/data itself is not necessarily removed as is the case in the intra-host IOAM data collection embodiment.

In the simplified example, and as shown in FIG. 4, packet 405 enters node 130 via address 10.11.12.13, which is recorded in IOAM header 410. Then, after packet 405 transits POD1 134_1 and POD2 134_2, IOAM header 410 is further updated with telemetry indicating that the packet 405 has transited PODs POD 1 10.144.1.1 and container 2 therein, and POD 2 10.144.1.2 and container 2 therein. When the packet 405 arrives back at vSwitch 160 the IOAM data may be extracted and sent, at 225, to analytics node 150. Analytics node 150 may then process the data and output IOAM data analytics 230 (e.g., packet path metrics, throughput, latency, etc.).

Figure 5:
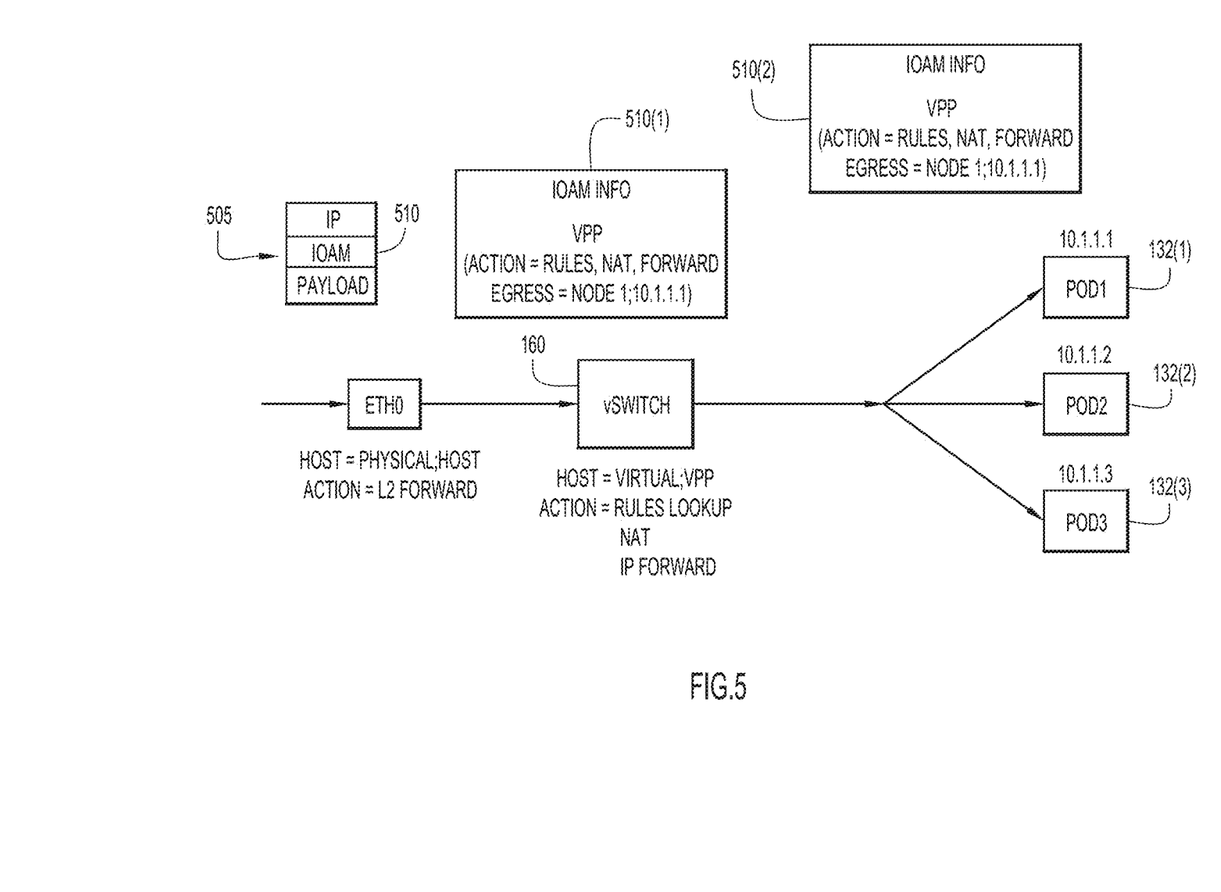
FIG. 5 illustrates a collection of verbose IOAM data in accordance with an example embodiment.

As in FIG. 2, the IOAM data comprises node and POD path information and, in the case of FIG. 4, also container information. Such path information may be, as mentioned above, considered "summary" IOAM data. In contrast, FIG. 5 illustrates collection of "verbose" IOAM data in accordance with an example embodiment. That is, instead of collecting only path information (e.g., network addresses), the IOAM header can also collect "action" or transformation data. Specifically, in FIG. 5, a packet 505 includes an IOAM header 510 and arrives at, e.g., a physical node 130. As shown, IOAM header 510 is successively updated with action information, in addition to path information, as it transits different elements of node 130. Thus, IOAM header 510(1) indicates that packet 505 is being sent to POD 1 132(1) at address 10.1.1.1. The actions that transpired include Rules, NAT and forwarding to the next address for POD 1 132(1) (as opposed to POD 2 132(2), or POD 3 132(3)). In this case IOAM header 510(2) is the same as IOAM header 510(1), signifying that the receiving POD 1 132(1) extracts the information. However, it is also possible that POD 1 132(1) adds still more data to the IOAM header 510(2).

Figure 6A:
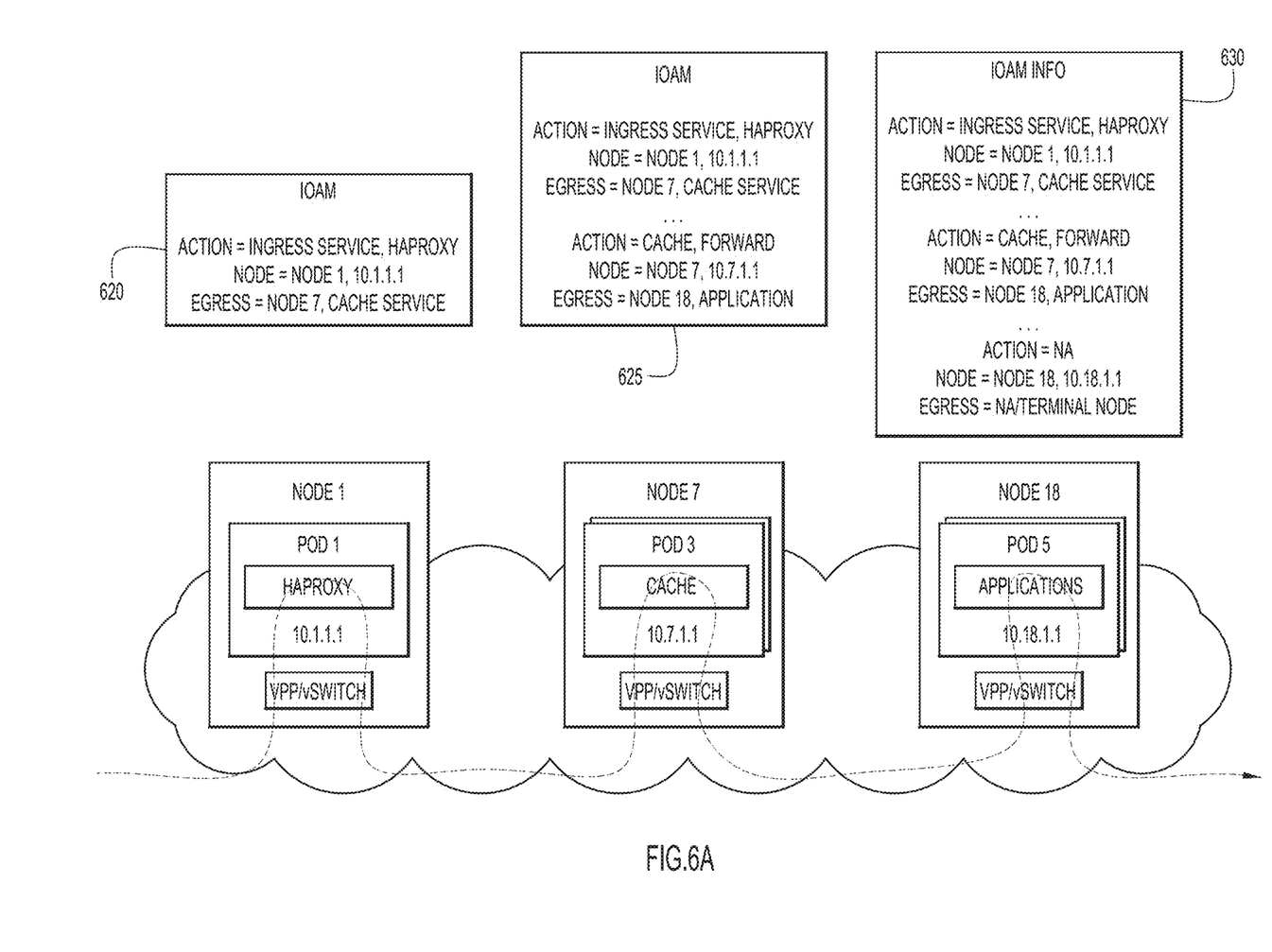
FIGS. 6A and 6B illustrate a collection of still more verbose IOAM data in accordance with an example embodiment.
Figure 6B:
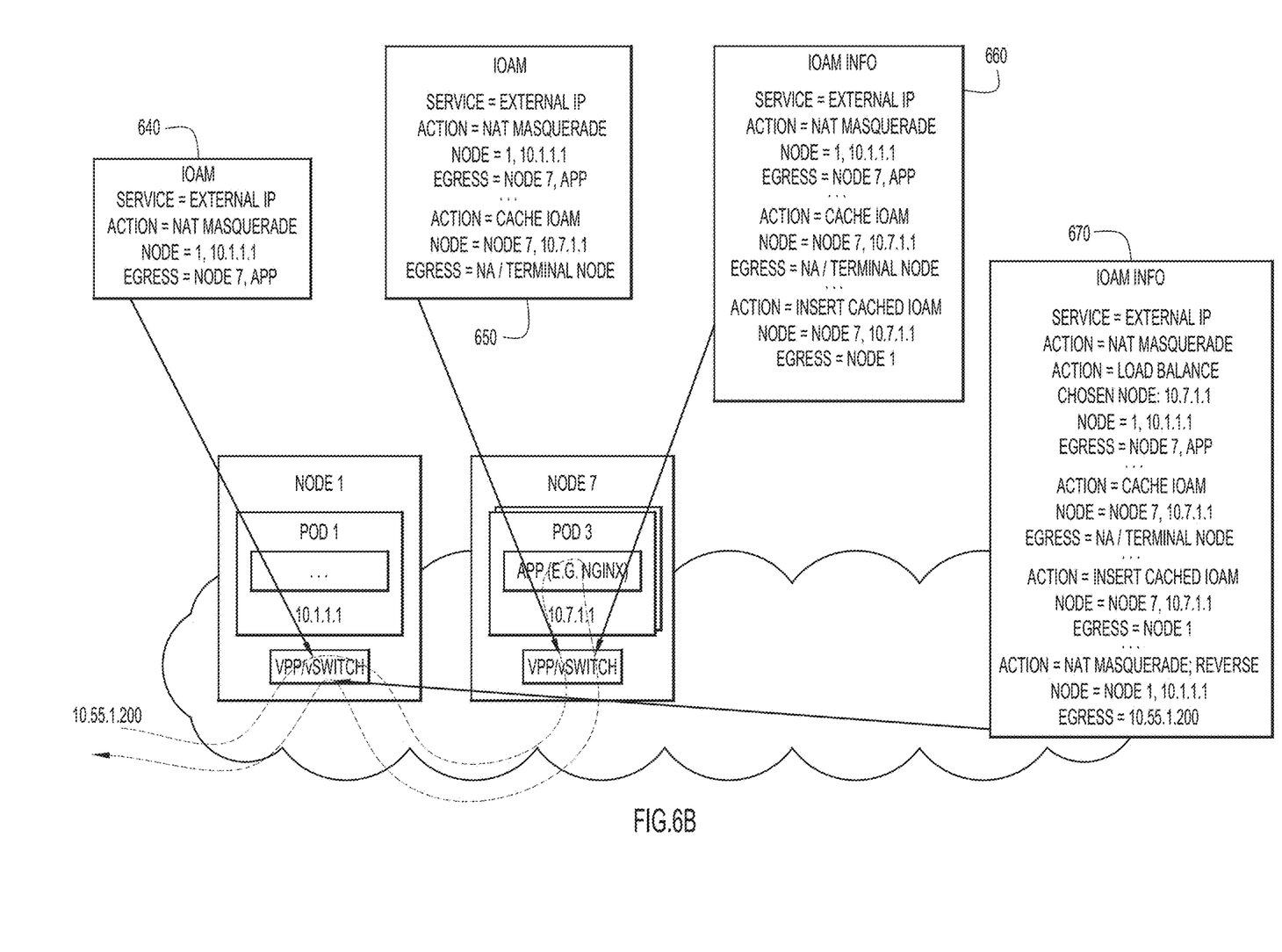

FIGS. 6A and 6B illustrate a collection of still more verbose IOAM data in accordance with an example embodiment. More specifically, FIG. 6A shows IOAM information 620, 630, 640 with respect to a packet transiting three nodes. The IOAM information includes actions, locations of those action and egress nodes. FIG. 6B is similar to FIG. 6A and shows IOAM information 640, 650, 660 and 670 for a packet that passes through nodes in two directions. In the case of both FIGS. 6A and 6B, at each successive step, more "verbose" information is added to the IOAM information, consistent with its path and the actions or transformation being performed on the packet.

Like the summary IOAM data, the verbose telemetry data can be implemented for either intra-host or in an end-to-end solution. Also, the IOAM verbose information may be extracted at any given host as may be desired for a given implementation. The type of verbose data may also be configurable by an administrator or operator, by configuring IOAM agent 301 to send appropriate instructions to packet forwarder 160.

Those skilled in the art will appreciate that the IOAM methodology for a container network environment described herein is applicable to any function that a node, POD or container might perform. For example, the following functions may be tracked:

Load-balancing: IOAM data may detail how a packet was balanced at a particular node (e.g. what rule was used for balancing—e.g., completely random, based on packet content/length, etc.).

Caching: IOAM data may indicate that a packet was cached for a duration of x time.

Transformation: IOAM data may indicate that a packet was transformed (e.g., TCP header compression, L7 content filtering/transformation for mobile setups (e.g., resize content to fit a particular screen).

Auditing: IOAM data may indicate that the packet was audited (e.g., the packet was analyzed by a web security appliance and considered safe, etc.).

Figure 7:
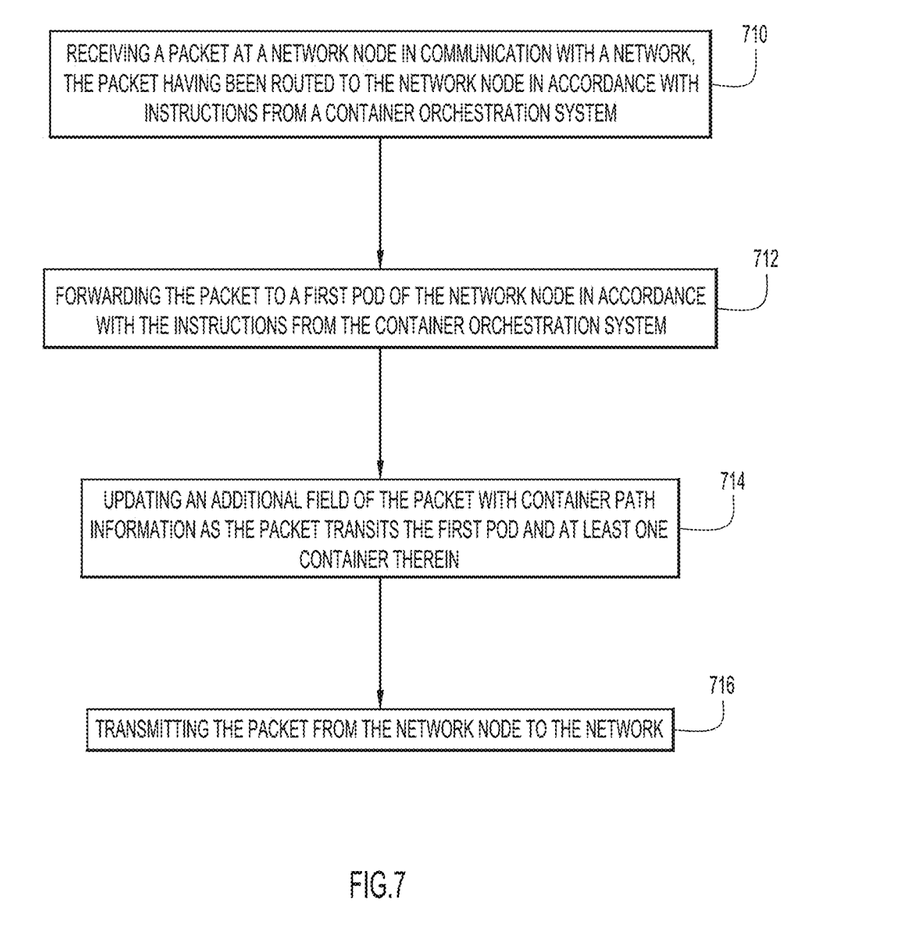
FIG. 7 is a flow chart depicting a series of operations that may be performed in connection with end-to-end IOAM data collection in accordance with an example embodiment.

FIG. 7 is a flow chart depicting a series of operations that may be performed in connection with end-to-end IOAM data collection in accordance with an example embodiment. At 710, a packet is received at a network node in communication with a network, the packet having been routed to the network node in accordance with instructions from a container orchestration system. At 712, the packet is forwarded to a first POD of the network node in accordance with the instructions from the container orchestration system. At 714, an additional field (header) of the packet is updated with container networking path information as the packet transits the first POD and at least one container therein. At 716, the packet is transmitted from the network node to the network.

Figure 8:
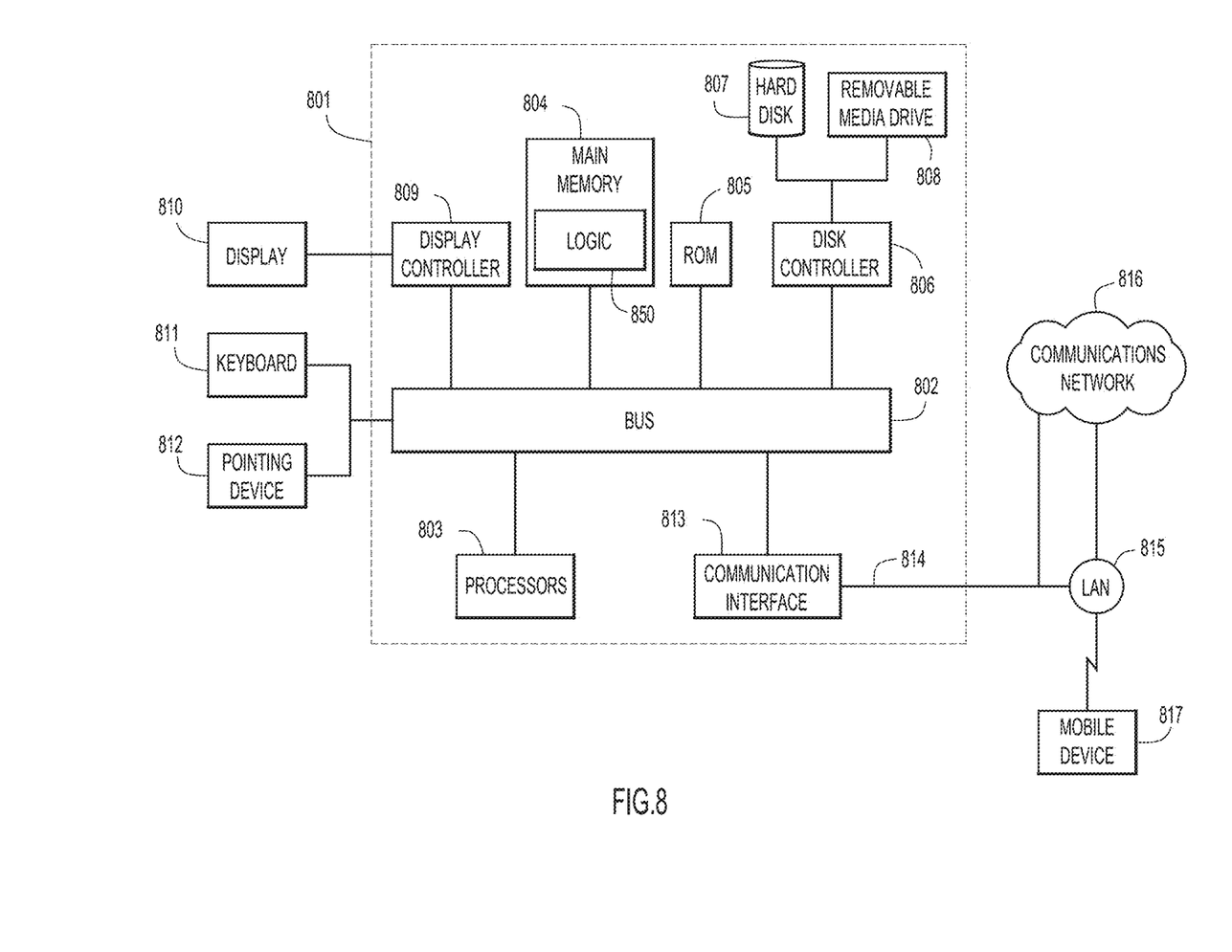
FIG. 8 depicts a device (e.g., physical host) on which aspects of the several described embodiments may be implemented.

FIG. 8 depicts a device (e.g., physical node 130) on which aspects of the several described embodiments may be implemented.

The apparatus may be implemented on or as a computer system 801. The computer system 801 may be programmed to implement a computer based device. The computer system 801 includes a bus 802 or other communication mechanism for communicating information, and a processor 803 coupled with the bus 802 for processing the information. While the figure shows a single block 803 for a processor, it should be understood that the processor 803 represents a plurality of processors or processing cores, each of which can perform separate processing. The computer system 801 may also include a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions (e.g., the logic to perform the operations of, e.g., FIGS. 3 and 7 described throughout and indicated as logic 850) to be executed by processor 803. In addition, the main memory 804 may be used for storing temporary variables or other intermediate information during the execution of instructions by the processor 803.

The computer system 801 may further include a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 may also include a disk controller 606 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 609 coupled to the bus 802 to control a display 810, such as a cathode ray tube (CRT), liquid crystal display (LCD), light emitting diode (LED) display, etc., for displaying information to a computer user. The computer system 801 may include input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing operations of the embodiments described herein in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the described embodiments, and for enabling the computer system 801 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816, e.g., network 100. For example, the communication interface 813 may be a wired or wireless network interface card or modem (e.g., with SIM card) configured to attach to any packet switched (wired or wireless) LAN or WWAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 614 may provide a connection to another computer through a local area network 815 (e.g., a LAN) or through equipment operated by a service provider, which provides communication services through the communications network 816. The network link 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813.

In summary, in one form, a method is provided. The method includes receiving a packet at a network node in communication with a network, the packet having been routed to the network node in accordance with instructions from a container orchestration system, inserting an additional field in the packet that is configured to record a path of the packet within a first POD of the network node that includes at least one container, forwarding the packet to the first POD of the network device in accordance with the instructions from the container orchestration system, updating the additional field with container networking path information as the packet transits the first POD and the at least one container therein, storing the container path information in an analytics node, removing the additional field from the packet; and transmitting the packet from the network node to the network.

In one implementation, the container orchestration system operates in accordance with Kubernetes.

In an embodiment, the additional field is configured as an In-Situ Operations, Administration, and Maintenance (IOAM) header field.

In one implementation, inserting the additional field in the packet is performed in response to receiving an instruction from an IOAM agent running on the network node. Inserting the additional field in the packet may be performed by a virtual switch within the network node.

In an embodiment, updating the additional field with container path information may include recording in the additional field an identifier of at least one POD that the packet transits and an identifier of at least one container that the packet transits.

The container path information may further include indications of an action performed by the at least one node and an action performed by the at least one POD or container.

In another embodiment, a device is provided. The device may include an interface unit configured to enable network communications, a memory, and one or more processors coupled to the interface unit and the memory, and configured to receive a packet from a network, the packet having been routed to the device in accordance with instructions from a container orchestration system, insert an additional field in the packet that is configured to record a path of the packet within a first POD of the device that includes at least one container, forward the packet to the first POD of the device in accordance with the instructions from the container orchestration system, update the additional field with container path information as the packet transits the first POD and the at least one container therein, store the container path information in an analytics node, remove the additional field from the packet, and transmit the packet from the device to the network.

In an embodiment, the container orchestration system operates in accordance with Kubernetes.

In one implementation, the additional field is configured as an In-Situ Operations, Administration, and Maintenance (IOAM) header field.

In an embodiment, the one or more processors may be further configured to insert the additional field in the packet in response to receiving an instruction from an IOAM agent. In one implementation, the one or more processors may be further configured to insert the additional field in the packet using a virtual switch within the device.

The one or more processors may be further configured to update the additional field with container path information by recording in the additional field an identifier of at least one POD that the packet transits and an identifier of at least one container that the packet transits.

The container path information may further include indications of an action performed by the at least one node and an action performed by the at least one POD.

There is also provided a method including receiving a packet at a network node in communication with a network, the packet having been routed to the network node in accordance with instructions from a container orchestration system, forwarding the packet to a first POD of the network node in accordance with the instructions from the container orchestration system, updating an additional field of the packet with container networking path information as the packet transits the first POD and at least one container therein, and transmitting the packet from the network node to the network.

The container orchestration system may operate in accordance with Kubernetes.

In an embodiment, the additional field may be configured as an In-Situ Operations, Administration, and Maintenance (IOAM) header field.

In one implementation, updating the additional field with container path information may include recording in the additional field an identifier of at least one POD that the packet transits and an identifier of at least one container that the packet transits. The container path information may further include indications of an action performed by the at least one POD and an action performed by the at least one container.

The action performed by the at least one node may include at least one of rule lookup or network address translation.

The above description is intended by way of example only. Various modifications and structural changes may be made therein without departing from the scope of the concepts described herein and within the scope and range of equivalents of the claims.

What is claimed is:

1. A method comprising:
receiving a packet at a network node in communication with a network, the packet having been routed to the network node in accordance with instructions from a container orchestration system;
forwarding the packet to a first pod of the network node in accordance with the instructions from the container orchestration system;
in response to instructions received, at the first pod, from an agent operating on the network node, inserting an additional field in the packet that is configured to record a path of the packet within the first pod of the network node that includes at least one container;
updating the additional field with container networking path information as the packet transits the first pod and the at least one container therein;
storing the container path information in an analytics node;
removing the additional field from the packet; and
transmitting the packet from the network node to the network.

2. The method of claim 1, wherein the container orchestration system operates in accordance with Kubernetes.

3. The method of claim 1, wherein the additional field is configured as an In-Situ Operations, Administration, and Maintenance (IOAM) header field.

4. The method of claim 3, wherein inserting the additional field in the packet is performed in response to receiving an instruction from an IOAM agent running on the network node.

5. The method of claim 1, wherein inserting the additional field in the packet is performed by a virtual switch within the network node.

6. The method of claim 1, wherein updating the additional field with container path information comprises recording in the additional field an identifier of at least one pod that the packet transits and an identifier of at least one container that the packet transits.

7. The method of claim 6, wherein the container path information further includes indications of an action performed by the at least one pod and an action performed by the at least one container.

8. A device comprising:
an interface unit configured to enable network communications;
a memory; and
one or more processors coupled to the interface unit and the memory, and configured to:
receive a packet, the packet having been routed to the device in accordance with instructions from a container orchestration system;
forward the packet to a first pod of the device in accordance with the instructions from the container orchestration system;
in response to instructions received, at the first pod, from an agent operating on the device, insert an additional field in the packet that is configured to record a path of the packet within the first pod of the device that includes at least one container;
update the additional field with container networking path information as the packet transits the first pod and the at least one container therein;
store the container path information in an analytics node of the device;
remove the additional field from the packet, and
transmit the packet from the device to the network.

9. The device of claim 8, wherein the container orchestration system operates in accordance with Kubernetes.

10. The device of claim 8, wherein the additional field is configured as an In-Situ Operations, Administration, and Maintenance (IOAM) header field.

11. The device of claim 10, wherein the one or more processors are further configured to insert the additional field in the packet in response to receiving an instruction from an IOAM agent running on the device.

12. The device of claim 8, wherein the one or more processors are further configured to insert the additional field in the packet using a virtual switch within the device.

13. The device of claim 8, wherein the one or more processors are further configured to update the additional field with container path information by recording in the additional field an identifier of at least one pod that the packet transits and an identifier of at least one container that the packet transits.

14. The device of claim 13, wherein the container path information further includes indications of an action performed by the at least one pod and an action performed by the at least one container.

15. A method comprising:
receiving a packet at a network node in communication with a network, the packet having been routed to the network node in accordance with instructions from a container orchestration system;
forwarding the packet to a first pod of the network node in accordance with the instructions from the container orchestration system;
in response to instructions received, at the first pod, from an agent operating on the network node, updating an additional field of the packet with container networking path information as the packet transits the first pod and the at least one container therein; and
transmitting the packet from the network node to the network.

16. The method of claim 15, wherein the container orchestration system operates in accordance with Kubernetes.

17. The method of claim 15, wherein the additional field is configured as an In-Situ Operations, Administration, and Maintenance (IOAM) header field.

18. The method of claim 15, wherein updating the additional field with container path information comprises recording in the additional field an identifier of at least one pod that the packet transits and an identifier of at least one container that the packet transits.

19. The method of claim 18, wherein the container path information further includes indications of an action performed by the at least one pod and an action performed by the at least one container.

20. The method of claim 19, wherein the action performed by the at least one container comprises at least one of rule lookup, network address translation, caching or auditing.

* * * * *